(12) United States Patent  (10) Patent No.: US 8,450,643 B2
Nachbargauer  (45) Date of Patent: May 28, 2013

(54) WELDING OR CUTTING DEVICE

(75) Inventor: Kurt Nachbargauer, Baden-Baden (DE)

(73) Assignee: IHT Automation GmbH & Co. KG, Baden-Baden (DE)

( * ) Notice: Subject to any disclaimer, the term of this patent is extended or adjusted under 35 U.S.C. 154(b) by 264 days.

(21) Appl. No.: 13/065,500

(22) Filed: Mar. 23, 2011

(65) Prior Publication Data

US 2011/0247998 A1  Oct. 13, 2011

(30) Foreign Application Priority Data

Apr. 12, 2010  (DE) .................. 20 2010 004 903 U

(51) Int. Cl.
*B23K 26/00* (2006.01)
*B23Q 17/22* (2006.01)

(52) U.S. Cl.
USPC .................. 219/121.83; 219/121.54; 266/76; 266/78

(58) Field of Classification Search
USPC .................. 266/76, 78; 219/124.02, 121.54, 219/121.6, 121.83; 324/207.15, 207.16, 207.17, 324/207.18, 207.19, 207.26
See application file for complete search history.

(56) References Cited

U.S. PATENT DOCUMENTS

| 3,024,354 | A  | * | 3/1962 | Mierendorf et al. | ..... 324/207.18 |
| 4,810,966 | A  | * | 3/1989 | Schmall | .................. 324/207.17 |
| 4,940,879 | A  | * | 7/1990 | De-Swaan | ............... 219/121.58 |
| 6,534,973 | B1 | * | 3/2003 | Sporl et al. | ............... 324/207.16 |
| 6,903,300 | B2 | * | 6/2005 | Faust et al. | ............... 219/121.54 |
| 2003/0109193 | A1 | * | 6/2003 | Schmall | ............................ 451/2 |

FOREIGN PATENT DOCUMENTS

DE  4212652 A1  * 10/1993

* cited by examiner

*Primary Examiner* — Geoffrey S Evans
(74) *Attorney, Agent, or Firm* — Collard & Roe, P.C.

(57) ABSTRACT

A welding or cutting device for welding or cutting electrically conductive work pieces has a pipe that accommodates feed lines, a nozzle for exit of a welding or cutting jet, such as a flame, for example, disposed at an end of the pipe, forming a device tip with its free end, and an inductive sensor device for measuring the distance between the device tip and the work piece. The sensor device has at least one magnetic coil, the windings of which run about a longitudinal device axis. The sensor device is a separate module, which is pushed onto the pipe and/or the nozzle, and releasably connected with the pipe and/or the nozzle.

10 Claims, 1 Drawing Sheet

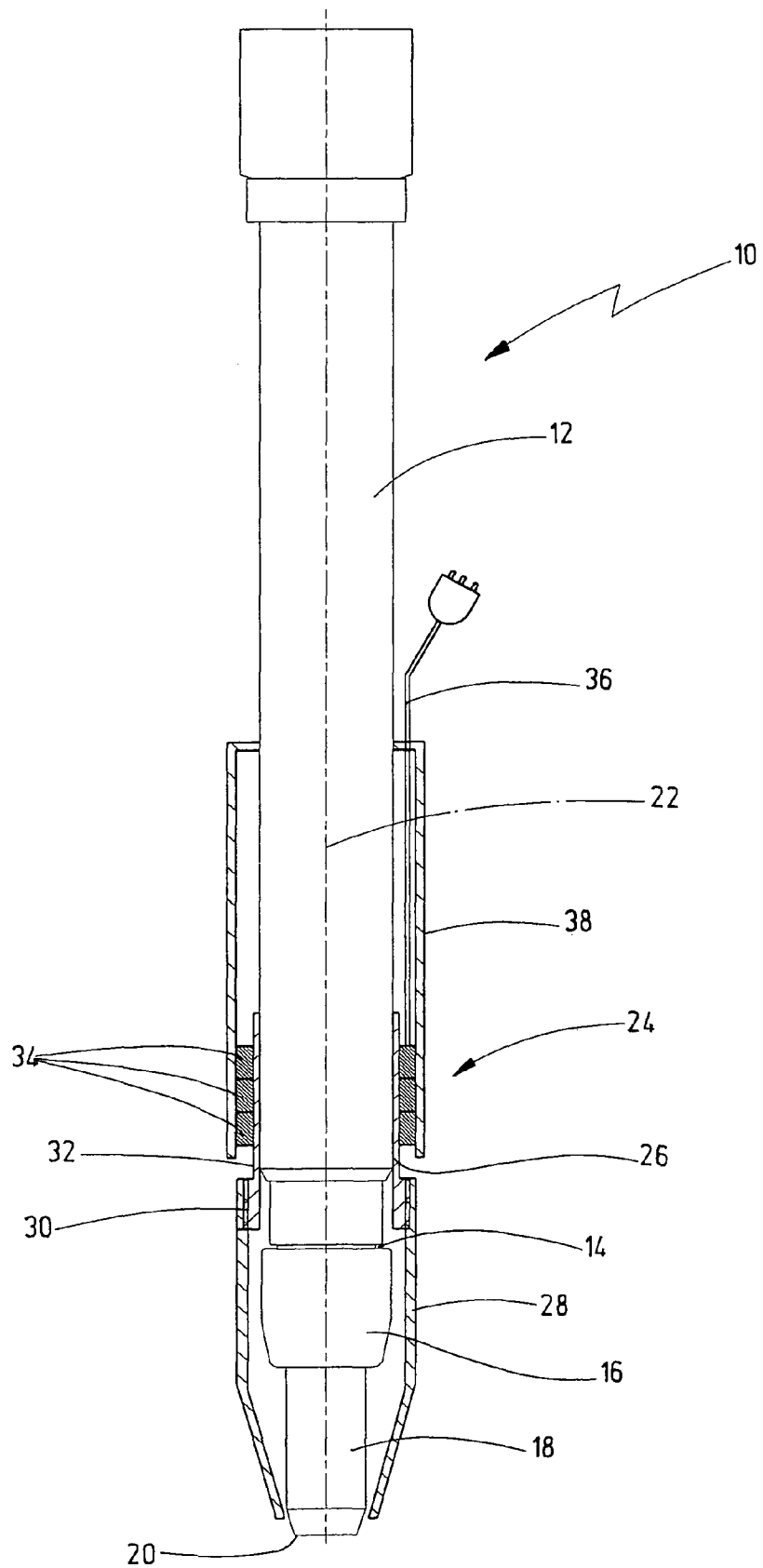

WELDING OR CUTTING DEVICE

CROSS REFERENCE TO RELATED APPLICATIONS

Applicant claims priority under 35 U.S.C. 119 of German Application No. 20 2010 004 903.2 filed Apr. 12, 2010, the disclosure of which is incorporated by reference.

BACKGROUND OF THE INVENTION

1. Field of the Invention

The invention relates to a welding or cutting device for welding or cutting electrically conductive work pieces, having a pipe that accommodates feed lines, a nozzle for exit of a welding or cutting jet such as a flame, disposed at an end of the pipe, forming a device tip with its free end, and an inductive sensor device for measuring the distance between the device tip and the work piece. The sensor device has at least one magnetic coil, the windings of which run about a longitudinal device axis.

2. The Prior Art

In order to determine the distance between the tip of such a processing device, for example a cutting torch, and the work piece, it is known to provide the cutting torch with a sensor device that has one or more magnetic coils. The inductance of the coil arrangement changes as it approaches the work piece, for example in that magnetization takes place within the ferromagnetic work piece, or in that eddy currents are produced within the work piece. The inductance of the coil arrangement can therefore be used to determine the distance between the torch tip and the work piece, after suitable calibration. Known sensor devices are integrated into the device. In particular, it is known to wind a magnetic coil onto a soft-magnetic core, which is an integral part of the device. If the magnetic coil now has to be replaced, the entire device always has to be taken apart. This is complicated.

SUMMARY OF THE INVENTION

It is therefore an object of the invention to further develop a welding or cutting device of the type stated initially, in such a manner that the sensor device can be replaced more easily.

This object is accomplished, according to the invention, a welding or cutting device for welding or cutting electrically conductive work pieces, having a pipe that accommodates feed lines, a nozzle for exit of a welding or cutting jet, such as a flame, for example, disposed at an end of the pipe, forming a device tip with its free end, and having an inductive sensor device for measuring the distance between the device tip and the work piece. The sensor device has at least one magnetic coil, the windings of which run about a longitudinal device axis. The sensor device is a separate module, which is pushed onto the pipe and/or the nozzle, and releasably connected with the pipe and/or the nozzle.

The configuration of the sensor device as a separate module makes it possible to separate it from the other components of the device in a simple manner. Installation and removal of the sensor device are particularly facilitated in that it is pushed onto the pipe or nozzle on the outside. Replacement of the sensor device, for example in the case of a defect or after damage, is then possible with a few simple hand motions. Furthermore, standardized devices are usually used, which have a pipe having a standard diameter. For this reason, a conventional device, particularly a cutting torch, can be retrofitted with such a sensor device.

It is preferred that the at least one magnetic coil is disposed at a distance from the device tip. At the torch tip, high temperatures are often reached, which can cause the insulation of the windings of the magnetic coil or the magnetic coils to melt. In the case of other welding or cutting devices, there is also the risk that a magnetic coil disposed too close to the device tip will be damaged, for example by material sprayed up from the work piece. This risk exists all the less, the farther the magnetic coil or the magnetic coils are removed from the device tip. In this connection, it is particularly preferred that the at least one magnetic coil is disposed around the pipe, and thus is situated above the nozzle.

To reinforce the inductance, it is practical if the sensor device has a sleeve consisting at least in part of soft-magnetic material, on the outside of which sleeve the at least one magnetic coil is disposed. The sleeve preferably extends over a part of the length of the pipe and over the majority of the length of the nozzle. By means of this measure, the magnetic field lines exit from the sensor device close to the work piece, so that the measurement accuracy is increased. The sleeve can be in one piece. However, it is preferred that the sleeve is composed of multiple pieces, with a first part disposed around the pipe, and a second part disposed around the nozzle. In this connection, the first part carries the magnetic coil or the magnetic coils. In order to achieve a good magnetic flow between the two parts, it is preferred that the two parts are disposed to overlap, and preferably are screwed onto one another. A screw connection by means of a cap nut, for practical purposes one composed of soft-magnetic material, is particularly preferred. The multi-part configuration of the sleeve offers the advantage that the sensor device does not have to be completely removed when the nozzle has to be replaced. Instead, it is sufficient to unscrew the second part of the sleeve, in order to expose the nozzle.

According to one embodiment, the sleeve is electrically insulated with regard to the pipe and the nozzle, and has an electrical voltage applied to it. If the sleeve comes up against a barrier, this can be indicated by measuring the current that flows then. Furthermore, a protective pipe that sheathes the at least one magnetic coil can be provided, which pipe protects the coil arrangement against damage. Furthermore, it is preferred that the sensor device is magnetically insulated with regard to the pipe and/or the nozzle, so that the progression of the magnetic field lines is better defined.

BRIEF DESCRIPTION OF THE DRAWINGS

Other objects and features of the present invention will become apparent from the following detailed description considered in connection with the accompanying drawing. It is to be understood, however, that the drawing is designed as an illustration only and not as a definition of the limits of the invention.

FIG. 1 shows a welding or cutting torch in a side view, partly in section.

DETAILED DESCRIPTION OF THE PREFERRED EMBODIMENT

Referring now in detail to the drawings, the cutting torch 10 shown in FIG. 1 has a torch pipe 12 having a standardized outside diameter of 32 mm, in which the lines for feed of the torch gases run. At the lower end 14 of torch pipe 12, a torch nozzle 18, the free end of which forms torch tip 20, is attached by means of a nut 16. The flame that forms during combustion of the torch gases exits from torch tip 20. Torch pipe 12, nut 16, and torch nozzle 18 are configured to be essentially rotation-symmetrical with regard to a longitudinal torch axis 22.

A sensor device 24, which has a sleeve composed of soft-magnetic material, is pushed onto torch pipe 12 and torch nozzle 18, on the outside. The sleeve consists of a first part 26, which is pushed onto torch pipe 12 and attached there, and a second part 28, which is connected with the first part 26 by means of a screw connection 30, and extends over the lower part of torch pipe 12 as well as over the majority of the length of torch nozzle 18. Toward the bottom, second part 28 of the sleeve is open, so that torch tip 20 projects out of it for a certain length.

Three magnetic coils 34, which can be connected with an evaluation unit by way of an electrical connection 36, are wound onto an outside 32 of first sleeve part 26. Coil arrangement 34 generates a magnetic field that also brings about magnetization of a work piece to be worked on, by way of the core formed by sleeve 26, 28, or generates eddy currents, so that the inductance of magnetic coils 34 is dependent on the distance of sleeve 26, 28 from the work piece. By measuring the inductance of one or all of magnetic coils 34, the distance of torch tip 20 from the work piece can therefore be determined. A protective pipe 38 is disposed around magnetic coils 34, and electrical connection 36 is also passed through this pipe.

By means of the releasable attachment of sleeve 26, 28 on torch pipe 12, simple installation or removal of sensor device 24 is possible. Furthermore, it is possible to retrofit conventional cutting torches having a standardized torch pipe by affixing such a sensor device 24.

It is understood, of course, that the invention does not just comprise cutting torches as shown in the drawing. In particular, water-jet cutting devices, plasma torches, or laser cutting devices are also possible welding or cutting devices according to the invention.

In summary, the following should be stated: The invention relates to a welding or cutting device 10 for welding or cutting electrically conductive work pieces, having a pipe 12 that accommodates feed lines, having a nozzle 18 for exit of a welding or cutting jet, such as a flame, for example, disposed at an end 14 of the pipe 12, forming a device tip 20 with its free end, and having an inductive sensor device 24 for measuring the distance between the device tip 20 and the work piece, whereby the sensor device 24 has at least one magnetic coil 34, the windings of which run about a longitudinal device axis 22. According to the invention, the sensor device 24 is a separate module, which is pushed onto pipe 12 and/or nozzle 18, and releasably connected with pipe 12 and/or nozzle 18.

Accordingly, while only a few embodiments of the present invention have been shown and described, it is obvious that many changes and modifications may be made thereunto without departing from the spirit and scope of the invention.

What is claimed is:

1. A welding or cutting device for welding or cutting electrically conductive work pieces, comprising:
   a pipe that accommodates feed lines;
   a nozzle for exit of a welding or cutting jet, said nozzle being disposed at an end of the pipe and forming a device tip with its free end, and
   an inductive sensor device for measuring the distance between the device tip and a work piece,
   wherein the sensor device has at least one magnetic coil having windings that run about a longitudinal device axis, and wherein the sensor device is a separate module, which is pushed onto at least one of the pipe and nozzle, and is releasably connected with at least one of the pipe and nozzle;
   wherein the sensor device has a sleeve consisting at least partially of soft-magnetic material, on the outside of which sleeve the at least one magnetic coil is disposed.

2. The welding or cutting device according to claim 1, wherein the sleeve extends over a part of the length of the pipe and over a majority of the length of the nozzle.

3. The welding or cutting device according to claim 1, wherein the sleeve is in one piece.

4. The welding or cutting device according to claim 1, wherein the sleeve is electrically insulated with regard to the pipe and the nozzle, and has an electrical voltage applied to it.

5. The welding or cutting device according to claim 1, wherein the sensor device has a protective pipe that sheathes the at least one magnetic coil.

6. The welding or cutting device according to claim 1, wherein the sensor device is magnetically insulated with regard to at least one of the pipe and the nozzle.

7. The welding or cutting device according to claim 1, wherein the at least one magnetic coil is disposed at a distance from the device tip.

8. The welding or cutting device according to claim 7, wherein the at least one magnetic coil is disposed around the pipe.

9. The welding or cutting device according to claim 1, wherein the sleeve is composed of multiple pieces, with a first part, which carries the at least one magnetic coil, disposed around the pipe, and with a second part disposed around the nozzle.

10. The welding or cutting device according to claim 9, wherein the first and the second part are screwed to one another by means of a cap nut composed of soft-magnetic material.

* * * * *